United States Patent [19]

Parker et al.

[11] Patent Number: 5,419,331
[45] Date of Patent: May 30, 1995

[54] SYSTEM FOR ESTIMATING TARGET VELOCITY FROM PULSE ECHOES IN RESPONSE TO THEIR CORRESPONDENCE WITH PREDETERMINED DELAY TRAJECTORIES CORRESPONDING TO DIFFERENT DISTINCT VELOCITIES

[75] Inventors: Kevin J. Parker; Sheikh K. Alam, both of Rochester, N.Y.

[73] Assignee: The University of Rochester, Rochester, N.Y.

[21] Appl. No.: 194,233

[22] Filed: Feb. 10, 1994

[51] Int. Cl.$^6$ .............................................. A61B 8/00
[52] U.S. Cl. ........................... 128/661.08; 128/653.1; 73/597
[58] Field of Search ........... 128/653.1, 660.01, 661.02, 128/661.08, 661.09, 661.10; 73/597; 364/424.01, 424.02, 424.07

[56] References Cited

U.S. PATENT DOCUMENTS

| | | |
|---|---|---|
| 4,809,002 | 2/1989 | Togashi . |
| 4,809,703 | 3/1989 | Ishikawa . |
| 4,817,617 | 4/1989 | Takeuchi . |
| 4,819,652 | 4/1989 | Micco . |
| 4,823,268 | 4/1989 | Giles et al. ............. 364/424.07 |
| 4,848,354 | 7/1989 | Angelsem . |
| 4,848,355 | 7/1989 | Nakamura . |
| 4,850,364 | 7/1989 | Leavitt . |
| 4,853,904 | 8/1989 | Pesque . |
| 4,873,985 | 10/1989 | Nakajima . |
| 5,188,112 | 2/1993 | Sturgill . |
| 5,188,113 | 2/1993 | Sato . |
| 5,190,044 | 3/1993 | Kawasaki . |
| 5,215,093 | 1/1993 | Miyazaki . |
| 5,220,923 | 6/1993 | Hagiwara . |
| 5,224,482 | 7/1993 | Nikoonahad . |
| 5,269,309 | 12/1993 | Fort et al. .............. 128/661.01 |

OTHER PUBLICATIONS

Vaitkis et al, Ultra. Med & Biol 14, 661-672 1988.

Kasai et al, IEEE Trans on Sonics & Ultrasonics, SU-32, 458-463 (1985).
Hein & O'Brien, IEEE Trans UFFC 40, 1-19 (1993).

*Primary Examiner*—George Manuel
*Attorney, Agent, or Firm*—M. Lukacher; Lee Fleckenstein

[57] ABSTRACT

In order to avoid the use of complex transform and correlation techniques for estimating the velocity of a target from which ultrasonic RF bursts are received as return echoes, the time of occurrence of successive returns are compared with a plurality of delay trajectories each representing a different target velocity. The trajectory with which the returns match with minimum variance, or maximum likelihood of being in time coincidence, provides an estimate of the velocity of the target. In different embodiments the RF return, the envelope of the return or the quadrature components thereof are processed to determine to which delay trajectory they are most proximal. The search for the delay trajectory is called a "butterfly search" in two dimensions (slow time or transmitted pulse repetition periods and fast time or range). Each butterfly line corresponds to a distinct linear velocity. The criterion that a signal corresponding to the returns should be equal in amplitude at all points along the correct trajectory may be used for envelope and RF signals. The use of the quadrature components is preferred in noisy environments, such as where the target is the scatterers in blood flow and blood flow velocity is to be determined. In the embodiment using the quadrature components, each butterfly line is searched for corresponding normalized likelihood ratio maxima, since such maxima occur on the correct butterfly line. The butterfly search can be implemented with less computation complexity than correlation or transform operations heretofore used for blood flow velocity estimation, and with fewer repeat pulses, and the results are more accurate in the presence of noise.

38 Claims, 11 Drawing Sheets

FIG. 7A
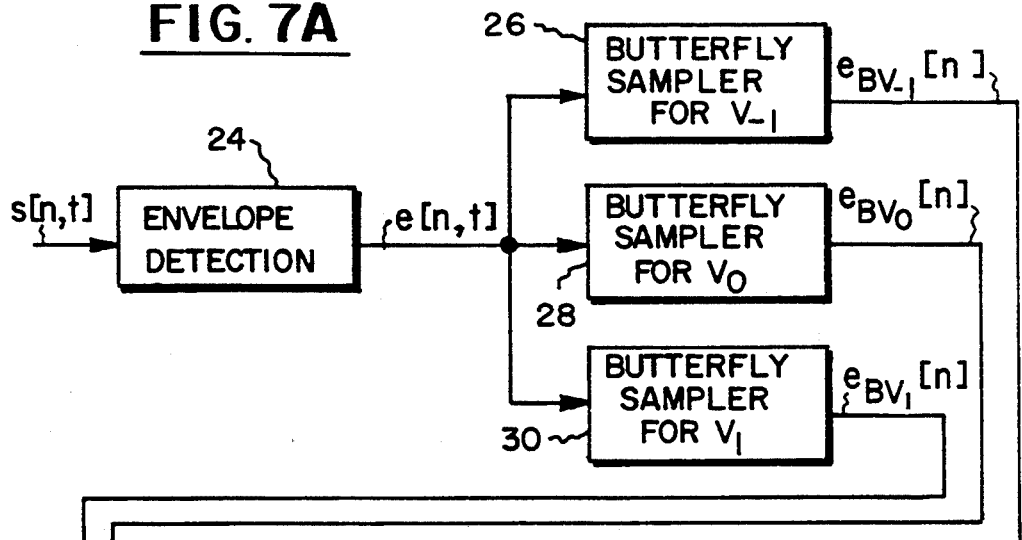
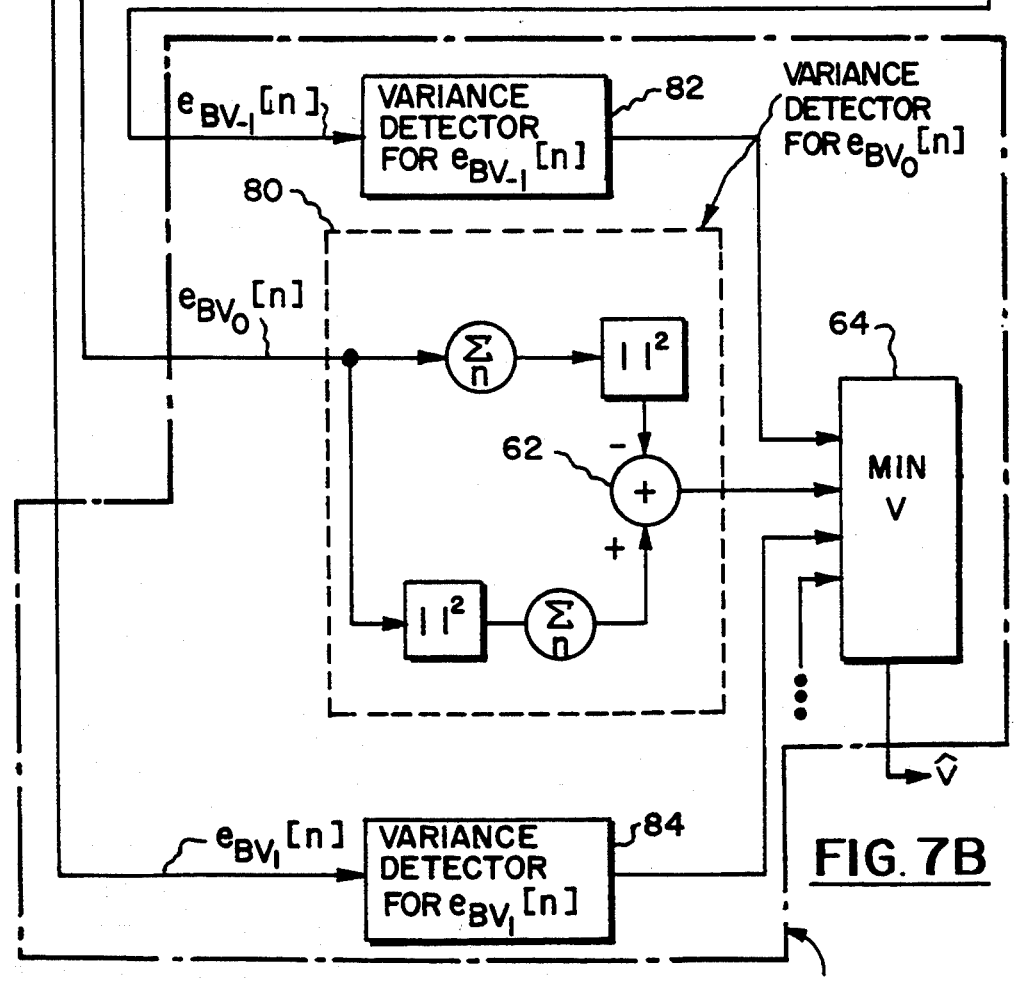
MAXIMUM CORRESPONDENCE DETECTOR FOR RF OR ENVELOPE
FIG. 7B

SYSTEM FOR ESTIMATING TARGET VELOCITY FROM PULSE ECHOES IN RESPONSE TO THEIR CORRESPONDENCE WITH PREDETERMINED DELAY TRAJECTORIES CORRESPONDING TO DIFFERENT DISTINCT VELOCITIES

DESCRIPTION

The present invention relates to systems (methods and apparatus) for estimating the velocity of moving targets and particularly the velocity of internal body structures such as tissue and particularly moving blood (blood flow). The invention utilizes the principles of pulse echo systems wherein bursts of signals are repetitively transmitted, propagate to a target and echoes or returns from the target are received, and particularly in which time domain processing of the returns is utilized, rather than frequency domain processing in which the frequency shift due to the Doppler effect is obtained.

In accordance with the invention, however, the returns are processed to search return echo signals for predetermined target trajectories. Conceptually in two dimensional space defined by time coordinates, one being the discrete, ordered times of transmission and the other the times of return of the echoes or the range of the target, the sets of times are along different realizations of a plurality of lines of different slope, each corresponding to a different target velocity. The lines are, thus, along different delay trajectories. The line or delay trajectory along which a plurality of successive returns is most proximal is found by searching over a plurality of different delay trajectories of the returns to determine the most likely correspondence to the expected return from a target traveling along that trajectory. The velocity corresponding to that trajectory provides an estimate of the velocity of the target.

The invention is especially suitable for use in diagnostic ultrasonic imaging and/or blood flow measurement instruments. The invention, however, is generally useful wherever pulse echo signals are transmitted and returns received and wherever the measurement of the velocity of a target is of interest.

Doppler techniques involving Doppler frequency shifts and time domain measurements on echoes have been used for velocity determination in medical diagnostic instruments, particularly where blood flow velocity is of interest. The noisy, clutter full environment in which such techniques are operative makes their application difficult. A system utilizing such techniques which has noise immunity and is robust enough to provide reliable accurate velocity estimates has long been, and is still, sought after by workers in the field. It is a feature of this invention to provide such a system.

Pulsed Doppler systems use the change of phase from successive reflections to estimate the velocity of the moving scatterer. Peak velocity can be found using the Fast Fourier Transform (FFT). Other methods like autoregressive spectral estimation can be used to find the peak velocity. A review of the Doppler frequency shift techniques for velocity estimation may be found in an article by Vaitkis, et al, "A Comparative Study and Assessment of Doppler Ultrasound Spectral Testimation Techniques, Pt. 1, Estimation Methods, in *Ultras. Med. & Biol.*, 14, 661–672 (1988). Mean velocity can be found using autocorrelation techniques disclosed in C. Kasai et al., "Real-time 2-Dimensional Blood Flow Imaging Using an Autocorrelation Technique," IEEE Trans., on *Sonics & Ultras.*, SU-32, 458–463 (1985). A representative implementation of such techniques may be found in Ishikawa, Katakura, and Ogawa, U.S. Pat. No. 4,809,703, issued Mar. 7, 1989. A different set of velocity estimators seek to determine the time shifts between successive transmission, using cross-correlation techniques. Time domain techniques have been reviewed in an article by Hein and O'Brien. "Current Time Domain Methods for Assessing Tissue Motion by Analysis from Reflected Ultrasound Echoes—A Review," IEEE Trans. UFFC, Vol. 40, pages 1–19 (1993). The implementation of such techniques in practical forms which are designed to accommodate noise and provide reasonable resolution, say of the order of a centimeter per second (cm/sec), have needed complex computational processes, such as correlations or transforms, in order to carry out the algorithms on which they are based. The problem therefore remains of providing a robust, noise immune system, which may be implemented with less complex and/or more efficient computational software and hardware than heretofore believed to be necessary by workers in this field, and it is a feature of this invention to provide an improved system for processing pulse Doppler returns which is more robust, and less complex than known systems for the same purpose and can operate in a noisy environment so that the improved system is a practical solution for blood flow velocity measurement.

The pulse Doppler measurements which are made in accordance with the conventional techniques, compute target velocity either from the spectrum of the returns or the time of occurrence of the returns at a specific range. The range is determined by the round trip delay time to the point of transmission of the ultrasonic RF pulses, usually the location of the transducer which both transmits the pulses and receives the return. In the case of frequency measurement techniques, usually using the FFT as a spectrum estimator, the maximum or mean single frequency in the spectrum at the preset range is determined. Turbulent flow is considered to have many velocities and may spread the spectrum. Variances of the measured velocities are computed in accordance with specified algorithms.

In contrast to these known techniques, the invention estimates velocity by finding upon which of a plurality of velocity lines or trajectories, each for a different velocity, successive returns are most proximal. The term "most proximal" in the context of the present invention should be taken broadly and to mean "most likely to correspond to the expected signals reflected from a target traveling at that specific predetermined trajectory." These lines have different slopes in coordinates of range and time of transmission of the RF pulses, which coordinates are orthogonal to each other. An array of such lines is called a "butterfly pattern", and the lines are called "butterfly lines". The determination of which butterfly line the returns fall on or are most proximal to is called a "butterfly search". By "RF" is meant sonic (including ultrasonic) and electromagnetic radiation generally; ultrasonic radiation being presently preferred for medical diagnostic applications.

The invention, briefly described, estimates the velocity of a moving target, such as blood flow, from pulse-echoes received in response to a plurality of repetitive transmissions of propagating pulse signals. The echoes are translated into a plurality of time displaced outputs which are located in a space having at least two dimensions defined by orthogonal axes, one of which is the times of transmission of the RF pulse signals and the other of which is the time elapsed between transmission of these pulse signals and the reception of the echoes in response thereto. The system operates by detecting upon which of a plurality of butterfly lines in an array containing that plurality of lines, the outputs corresponding to the echoes are most proximal. The detection of the most proximal line may be carried out using a butterfly search. Each line has a different slope and defines a delay trajectory of the times of return of the echoes. The trajectory of the echoes (their time delay relationship) is effectively compared with the butterfly line trajectories. The estimate of the velocity of the target (e.g, the velocity of the ultrasonic energy scatterers which move in blood flow) is provided by the line having the trajectory most proximal to the trajectory of the output pulses.

The echoes may be translated into signals by processing the RF returns and utilizing the RF bursts. The envelopes of the RF bursts may also be used, or the bursts corresponding to the returns may be quadrature demodulated to provide quadrature related components as the outputs. These outputs are preferably digitized and sampled. Different signals constituted of samples which fall along the different butterfly lines are obtained. The butterfly line whose samples most closely correspond to the expected echoes returning from a target traveling at that predetermined velocity, is selected as the most proximal butterfly line. The predetermined velocity of this butterfly line is output as the velocity estimate. In the case of an envelope signal or an RF signal, a constant amplitude is expected from a butterfly line that exactly matches the trajectory of a target traveling at constant velocity. In the case of quadrature components, a constant amplitude, sinusoidally varying signal (of known frequency), is expected from a butterfly line that exactly corresponds to the echoes from a target traveling at constant velocity. In either case, all butterfly line signals can be evaluated to choose the single line with maximum correspondence between reflected echoes and the expected signal from a target traveling at velocities corresponding to the slope of each butterfly line.

The foregoing objects, features and advantages of the invention, as well as presently preferred embodiments thereof, will become more apparent from a reading of the following description in connection with the accompanying drawings in which.

Figure 5:
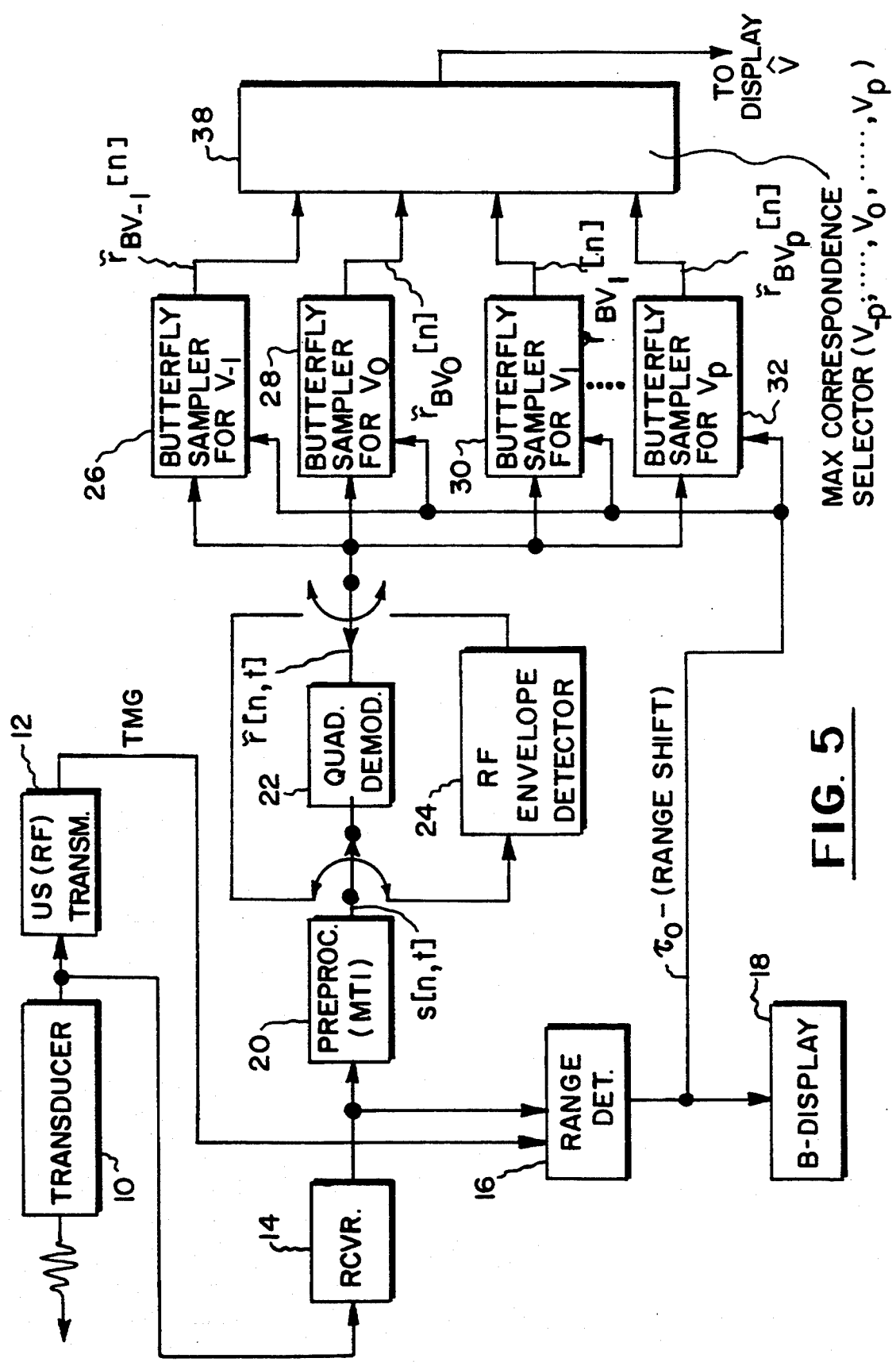
FIG. 5 is a block diagram of an ultrasonic imaging system having facilities for conducting a butterfly search to obtain the velocity of transcutaneous tissue, such as blood flow velocity.
Figure 6:
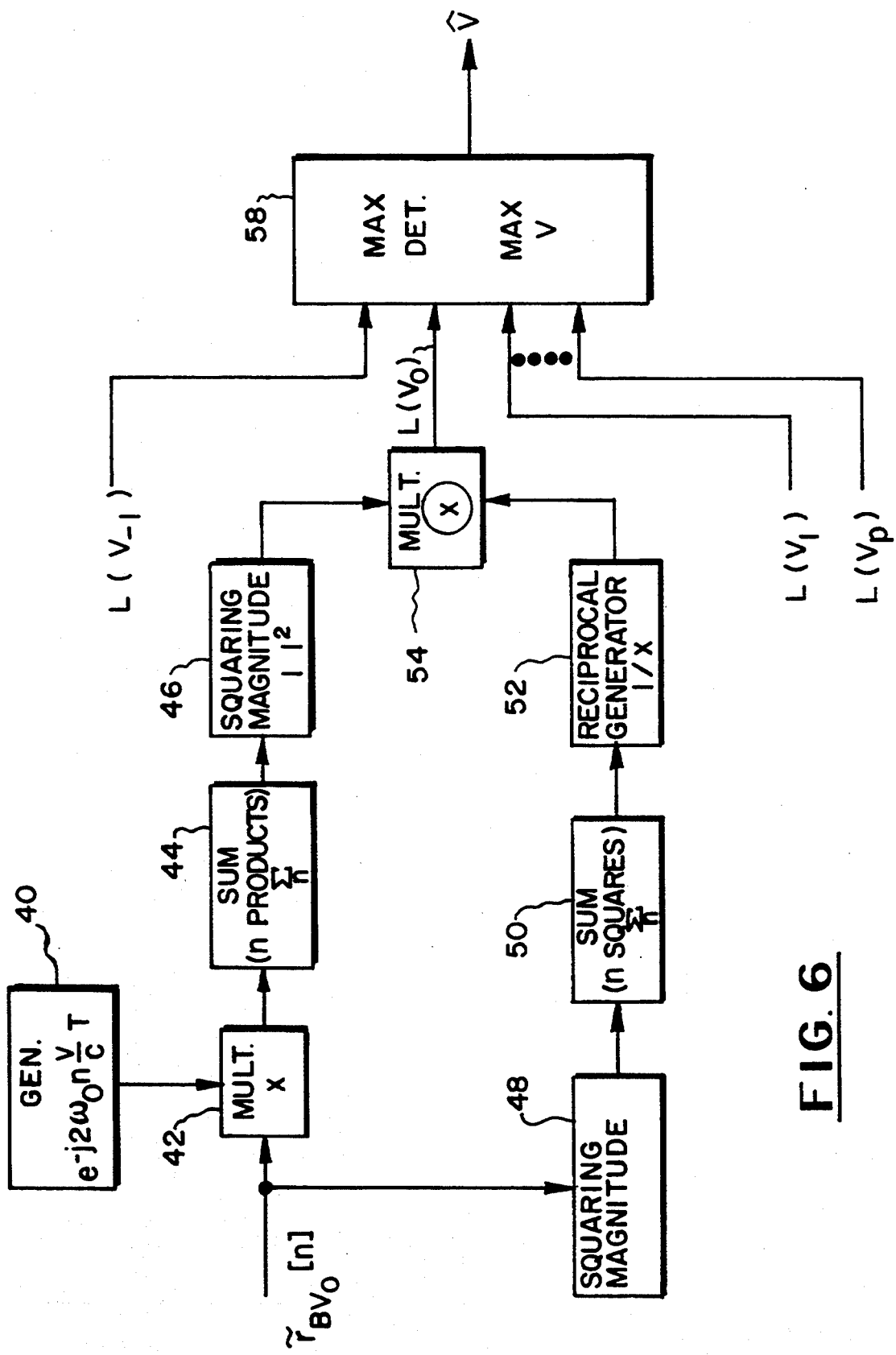
FIG. 6 is a block diagram of the maximum correspondence selector shown in FIG. 5 for the case where quadrature components are processed.
Figure 8:
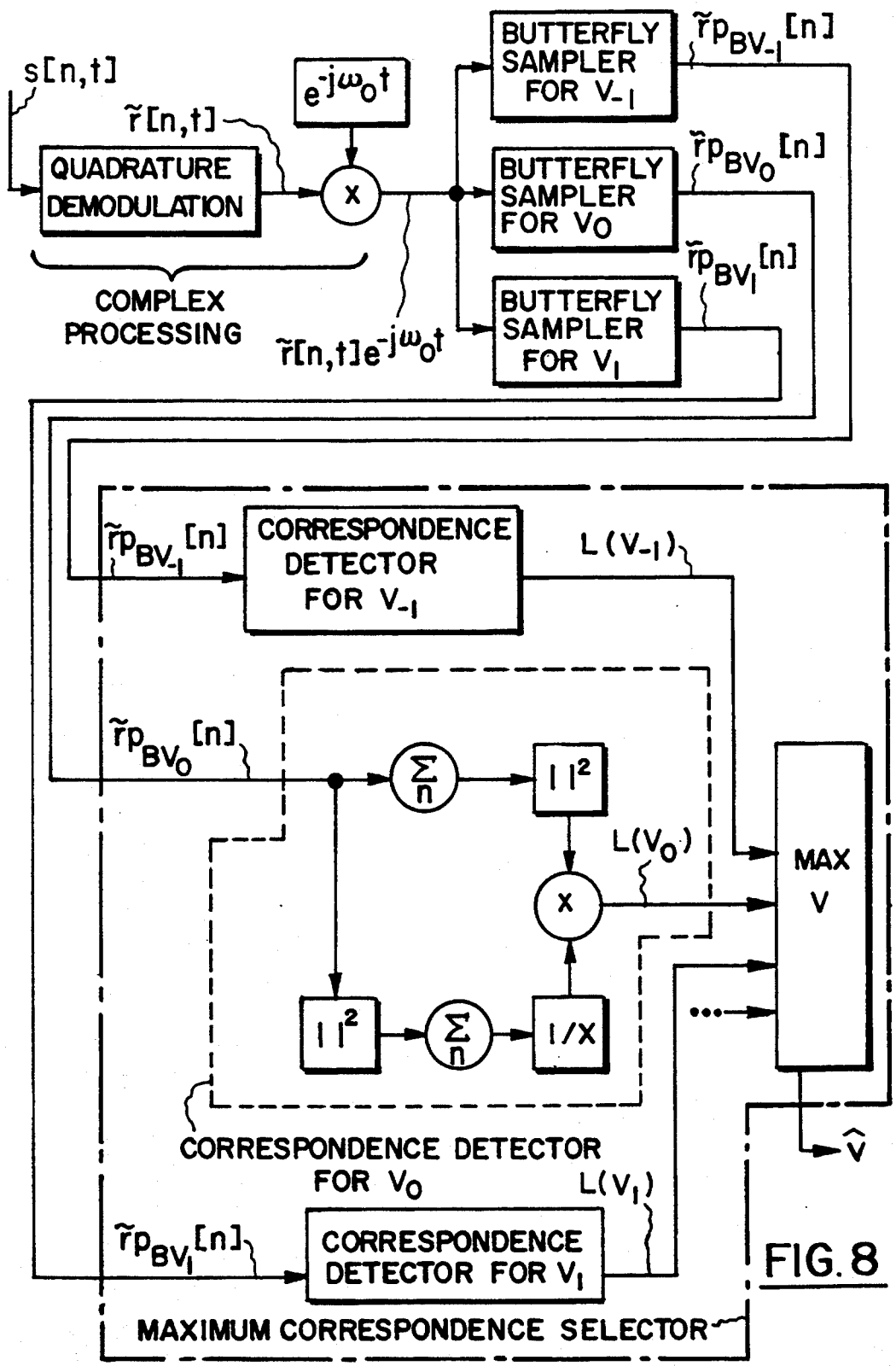
Figure 9:
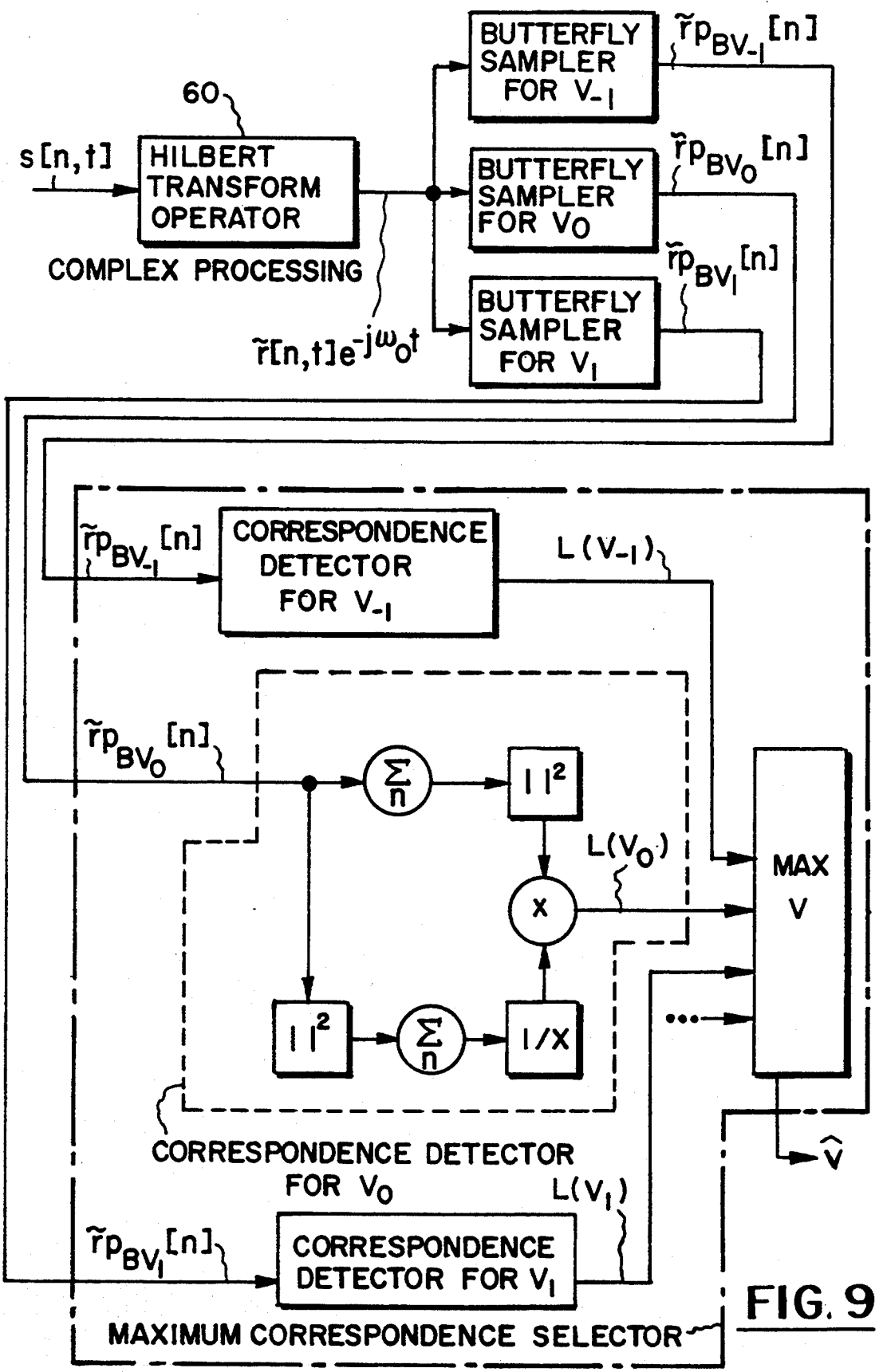
Figure 10:
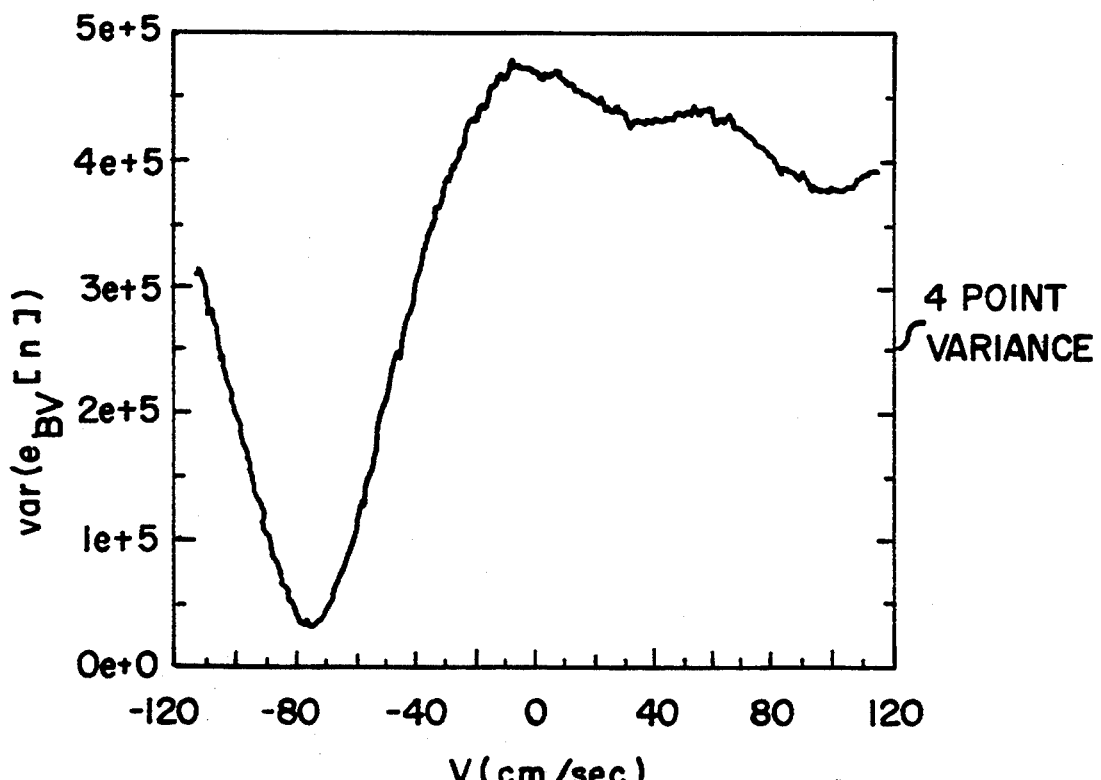
Figure 11:
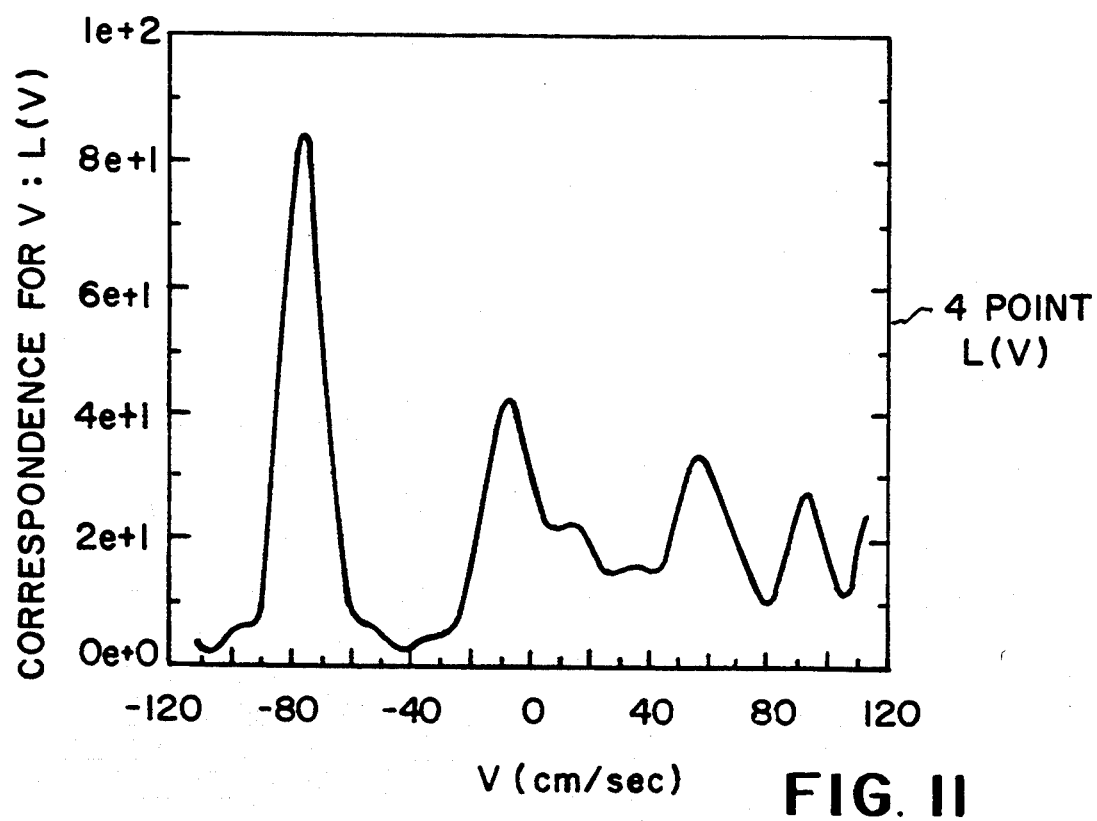

FIGS. 7a & b are respectively block diagrams of an embodiment of the maximum correspondence selector system of FIG. 5 using an envelope detection demodulator, sampler array and butterfly line variance detection array which is useful when RF pulse returns or the envelopes thereof are processed in a butterfly search for the most likely target velocity;

FIG. 8 is a block diagram of another embodiment of the system which produces quadrature components and uses complex processing to premultiply the complex envelope (quadrature I and Q components) with a complex operator, the sampler and a maximum correspondence selector of less complexity than the estimator of FIG. 6 and which may be used in the system shown in FIG. 5;

FIG. 9 is a block diagram of another embodiment of the system using complex processing of the RF returns with a Hilbert transform operator, the system being otherwise similar to that shown in FIG. 8;

FIG. 10 is a plot showing the variance detector outputs from the RF envelope signals on the butterfly lines for an exemplary case of four transmissions (n=4) and with no additive noise which shows that for this case the variance minimizes on a butterfly line corresponding to the correct velocity of $-75$ cm/sec. (minus velocities indicating a target approaching the point of transmission of the ultrasonic pulses and positive velocities indicating a target moving away from the point of transmission); and FIG. 11 is a plot showing the correspondence detector outputs for different butterfly lines for an exemplary case of n=4 returns and showing that the correspondence detector outputs with no additive noise, maximizes on a butterfly line for the correct velocity of $-75$ cm/sec. (minus velocities indicating a target approaching the point of transmission of the ultrasonic pulses and positive velocities indicating a target moving away from the point of transmission).

Referring to FIGS. 1, 2, 3 and 4, there are shown plots in two dimensional space along two different time axis which are orthogonal to each other. The abscissa is in much slower time than the ordinate. The abscissa represents successive Doppler pulse transmissions of ultrasonic, RF signals. The transmissions are separated in time by the reciprocal of the pulse repetition frequency which is the pulse repetition period or interval. The repetitive transmissions are n=0, 1, 2 ... N. There are five transmissions in the plots of FIGS. 1-4. A feature of the system provided by the invention is that the velocity of the target is determinable with two transmissions. A practical and accurate system needs at least three transmissions. A set of eight or less transmissions (repetitive RF pulses transmitted towards the target) is presently preferred.

The ordinate axis is the fast time or twice the range from the location where the transmission is originated (the round trip travel time of the RF wave). The entire set of returns or echoes preferably occurs in less than the period between repetitions (PRT). Therefore, the ordinate is in fast time relative to the abscissa which is in slow time.

Drawn on the plots is an array or pattern of intersecting lines which are the butterfly pattern of butterfly lines. The intersection is at a particular range where the target is located; for example, the distance between the transducer which transmits and receives the ultrasonic, RF pulses and the blood vessel where the blood flow velocity is to be measured. The pattern may be effectively a "V" pattern, such as the inverted "V" shown in FIG. 3. There, the range is closer than in FIGS. 1, 2 and 4 to the target of interest. The location of the intersection and the butterfly pattern may be varied automatically, utilizing the range determining components of an ultrasonic imaging system embodying the velocity detection system described herein, as will be explained in connection with FIG. 5 hereinafter.

Each line of the pattern has a different slope and corresponds to a discrete linear velocity. The line to which the echoes are most closely proximal, and in the exemplary case as shown in FIGS. 1-4 where, for convenience of illustration, the peaks of the RF return or the demodulated versions thereof occur, represents the velocity estimate. This line is indicated as $v_0$ for convenience. If all of the pulses were on the line indicated as $v_{-2}$, the target reflector would be stationary since the travel time for each transmitted pulse and its echo then the same. In general, positive velocities away from the source (the transducer) are represented by butterfly lines of positive slope, while velocities of targets moving towards the source are represented by lines of negative slope as defined by the (n,t) coordinate system.

The correct velocity estimate is obtained by a butterfly search. This search is conducted to determine whether the time relationship of the echoes or returns is along the trajectory in the two dimensional, slow time—fast time space, defined by a butterfly line. As the description of systems implementing the butterfly search will make more apparent, the trajectories are sampling trajectories for echo samples in such time relationship that they fall on or are proximal to one of the lines in the butterfly pattern. Each sampling trajectory results in a one dimensional signal for all of the samples, $$r_{Bv_i}[n],$$

where i denotes each butterfly line in the array, that is the lines for $v_1$, $v_0$, and $v_{-1}$ to $v_{-5}$ in the plots illustrated in FIGS. 1 to 4.

Figure 1:
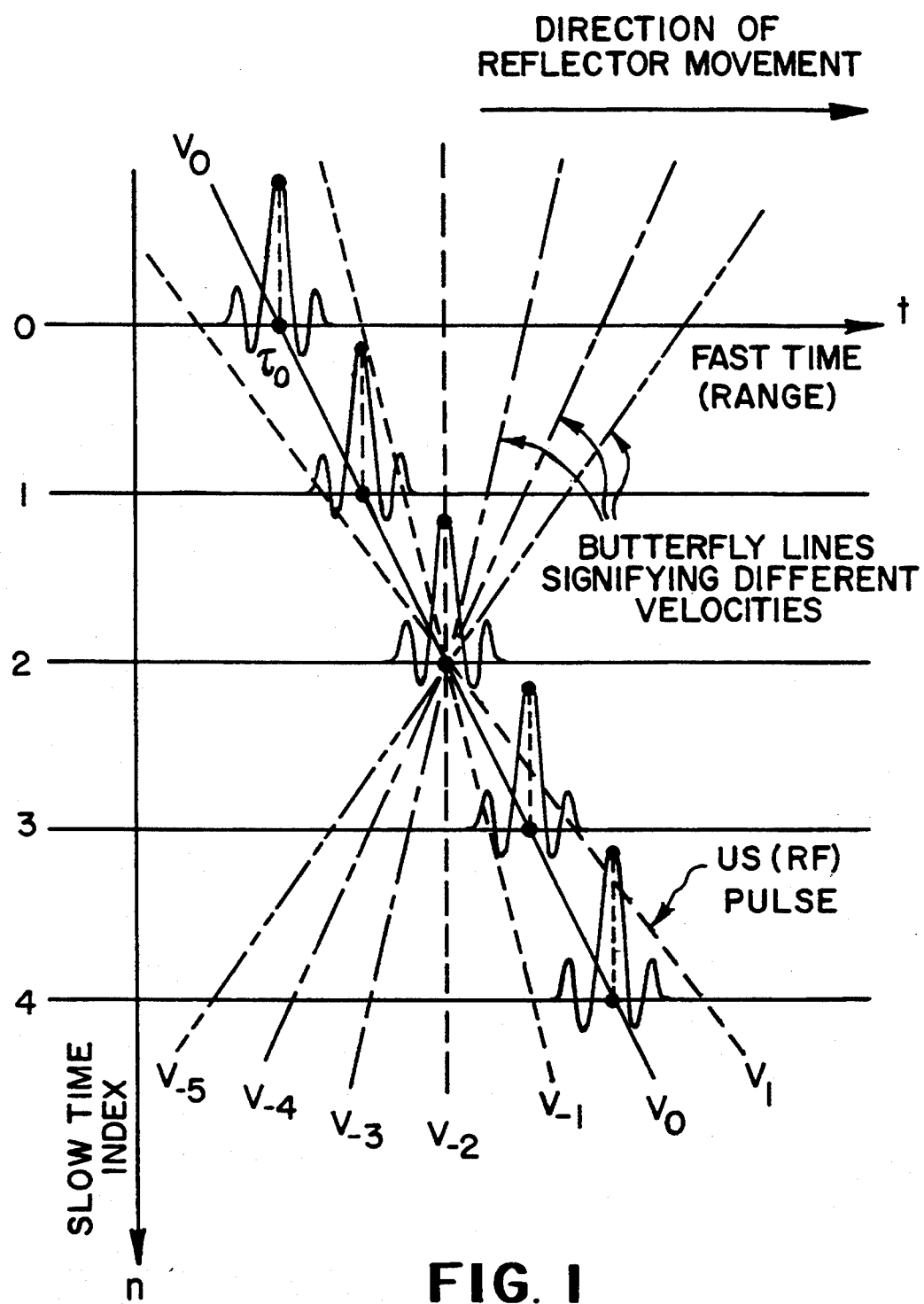
FIG. 1 is a plot showing in slow time (pulse repetition period) and fast time (range) coordinates, an array of butterfly lines and ultrasonic RF return pulses which fall on one of the lines for a target velocity $v_0$.

FIG. 1 illustrates the echoes as bursts or pulses of ultrasonic RF signals, each being a US (RF) ultrasonic RF pulse. FIG. 1 shows the correct estimate is $v_0$ since the expected constant amplitude samples of each of the five RF pulses 0 to 4 coincide with and fall on the butterfly line corresponding to $v_0$.

Figure 2:
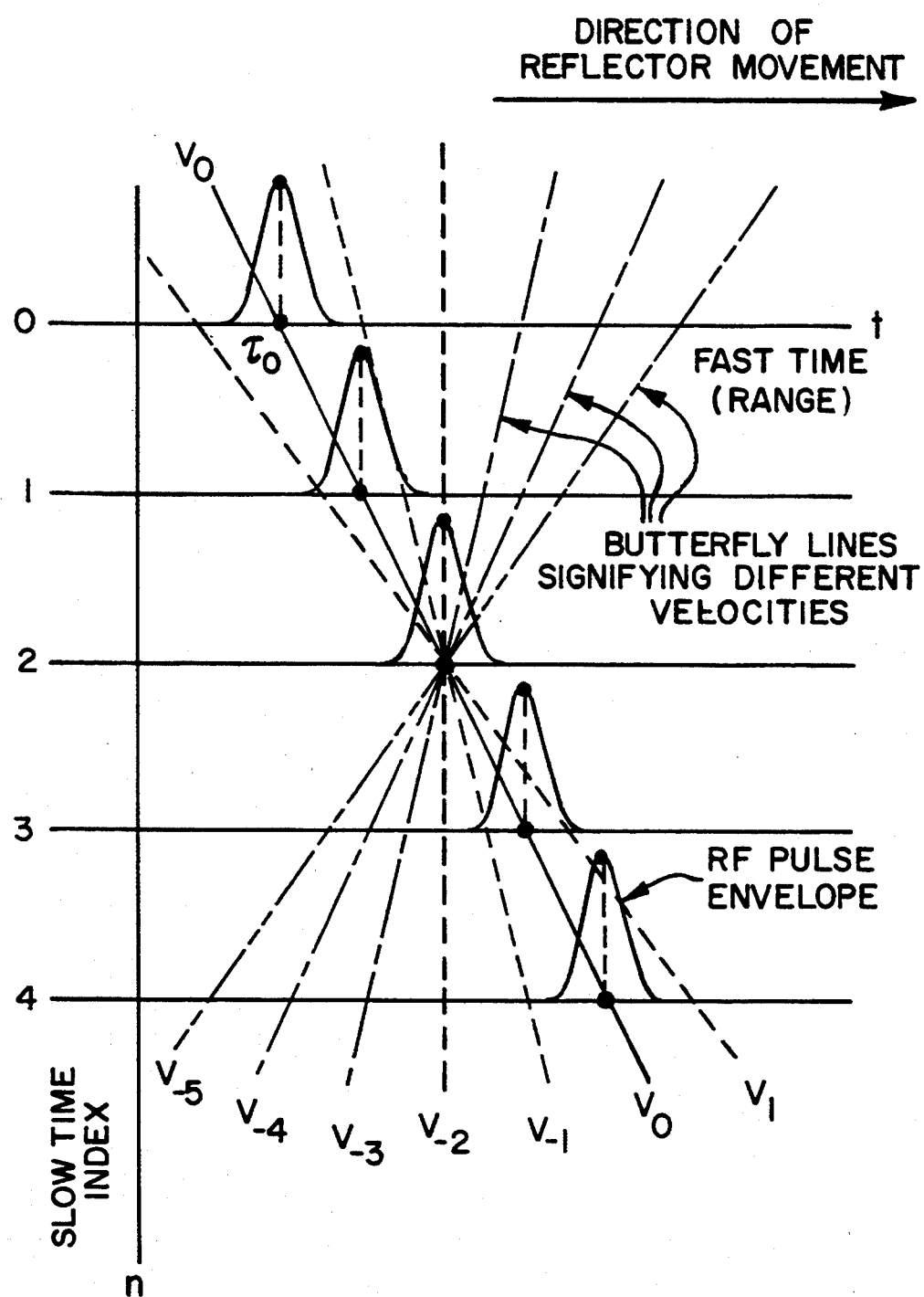
FIG. 2 is a plot similar to FIG. 1 showing the demodulated RF pulse envelopes of the returns.

FIG. 2 shows the use of the RF pulse envelope after demodulation. Just like the constant amplitude of the RF pulse shown in FIG. 1, the constant amplitude of the envelope falls on the $v_0$ butterfly line. The constant amplitudes of both the RF pulse and the envelope also have minimum variance and, indeed, are constant in FIGS. 1 and 2 along the butterfly line $v_0$. There is a constant delay $\tau_0$. This delay is a constant travel time for the transmission and its echo, and may be subtracted from each round trip travel time to obtain the time delay relationship of the echoes. This time delay is, in the plots of FIGS. 1 to 4, on the trajectory of the $v_0$ butterfly line. The butterfly search finds which of the butterfly lines corresponds to the trajectory of the echoes as defined by their time delay relationship. Thus, by matching the sampling trajectory of the butterfly lines with the actual delay trajectory of the echoes, the line that has the most constant amplitude or minimum variance will give the correct estimate of the velocity of the target, in effect the maximum correspondence to the butterfly lines is obtained. The processing is somewhat different for rf and envelope from that for quadrature components as will become more apparent hereinafter.

Figure 4:
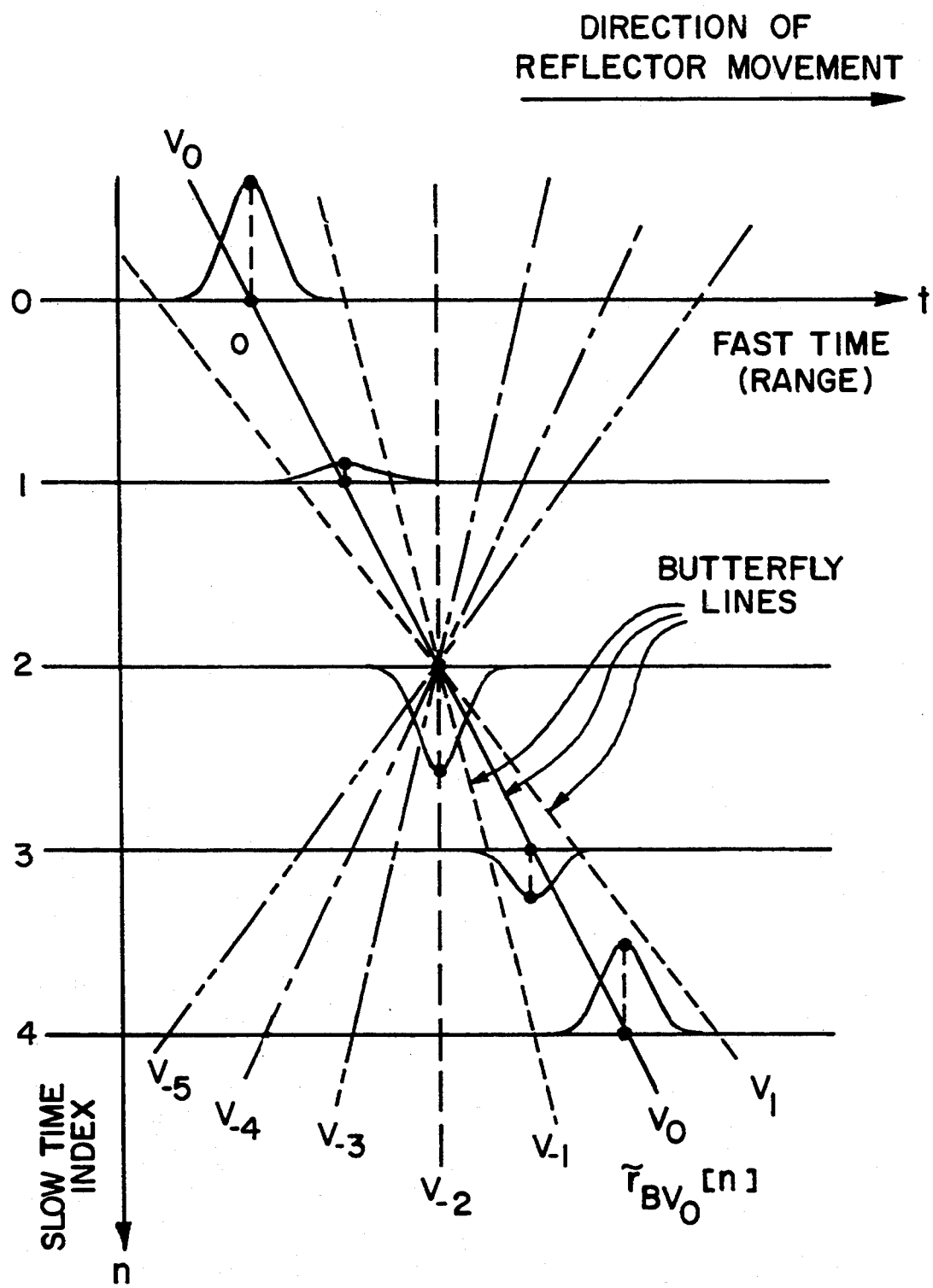
FIG. 4 is a plot similar to FIG. 2, showing only one of the quadrature components and showing the samples obtained for echo returns, the maxima of which is shown by way of example as falling along one of the butterfly lines for velocity $v_0$.

FIG. 4 illustrates one quadrature component resulting from quadrature demodulation of the RF pulse echoes. The combination of both quadrature components, along the butterfly line corresponding to target velocity $v_0$ is defined as $$\tilde{r}_{Bv_0}[n];$$

both components of $$\tilde{r}_{Bv_0}[n]$$

vary in amplitude, but does so as a constant amplitude sinusoidal function. If the velocity of the target changes, so would the correct butterfly line and the frequency of the sinusoidal function. In the butterfly search using quadrature components, correspondence functions or ratios are obtained from each set of samples. Since they maximize on the correct butterfly line, they indicate the correct butterfly line, such that the velocity corresponding thereto, may be taken as the velocity estimate of the target.

Figure 3:
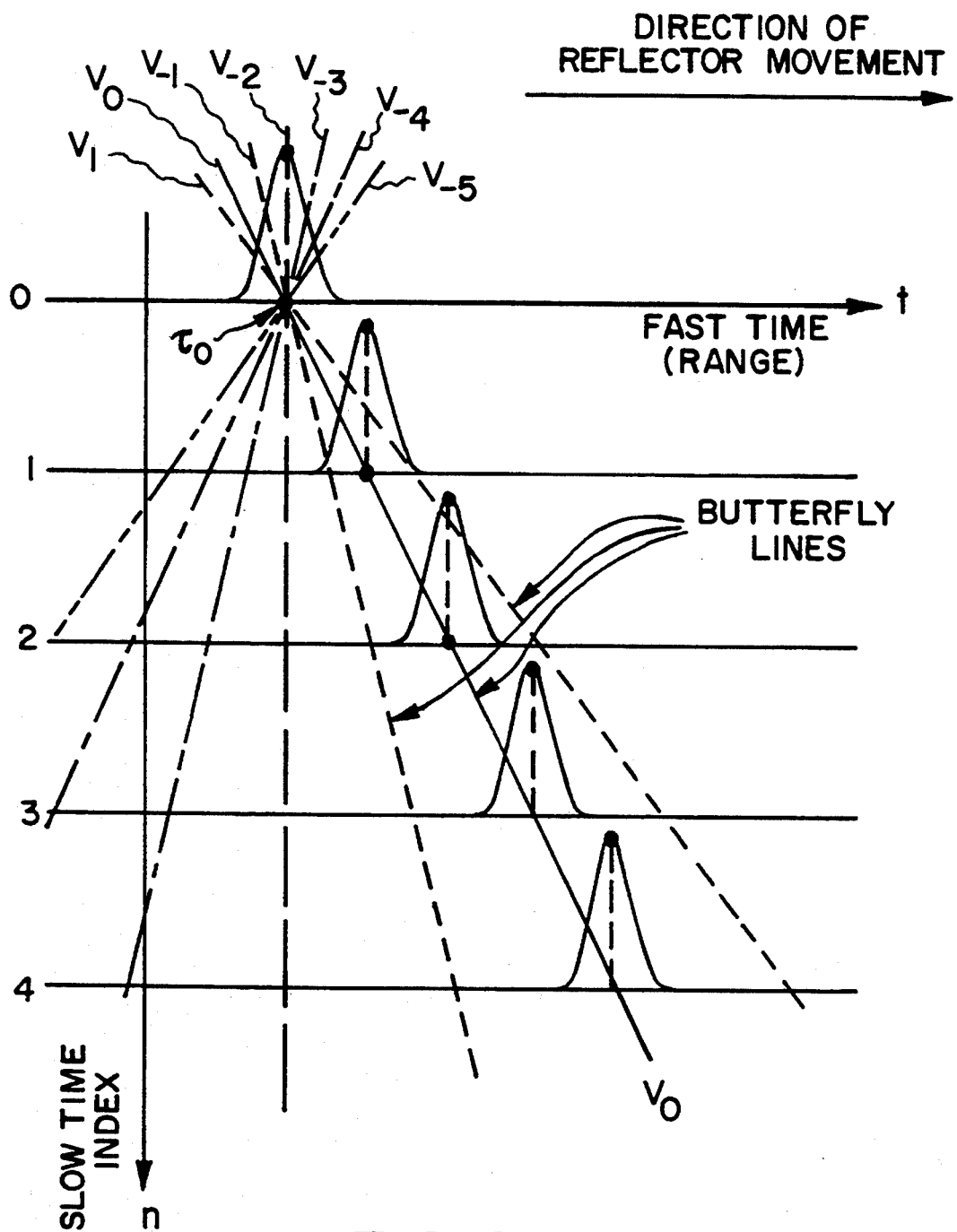
FIG. 3 is a view similar to FIG. 2 but showing the butterfly lines in inverted "V" form and intersecting on the line corresponding to the first transmission.

In FIGS. 2 and 3 where envelopes from the signal reflector are shown, this search is along butterfly lines of constant velocity in two dimensional (fast time, slow time) space. As the reflecting target moves, the echoes are translated in time. Samples along a line of the correct velocity (the $v_0$ butterfly line in FIGS. 2 and 3) have minimum variance. The butterfly search is carried out by sampling at different delays for each of the n echoes. Whichever butterfly line produces the minimum variance (the $v_0$ line in the plots), is the correct estimate of the reflector target velocity. As pointed out above, in FIGS. 2 and 3, where the envelope has Gaussian variation, on the $v_0$ line, all samples have the same value and hence, the variance is zero. In addition to minimum variance, the correct line may be found using minimum sum of absolute difference computations. A finite number of butterfly lines are used. The number of lines and their spacing may be increased or decreased depending upon the desired resolution in the velocity estimates. A large number of lines may be needed in some cases. For example, lines corresponding to velocities from —120 cm/sec to +120 cm/sec may be suitable for most diagnostic, blood flow measurement applications. See FIG. 10 for the output of the processing of the envelope components of FIGS. 2 & 3 and FIG. 11 for the output of the processing of the quadrature components as shown in FIG. 4.

Referring to FIG. 5, a transducer 10 emits an ultrasonic RF pulse, for example, from 500 KHz to 50 MHz, preferably 3 MHz for blood flow measurements. This pulse interacts with a reflector or scatterer from the moving target where a part of the wave is reflected. The reflection due to each successive transmission (a transducer firing or ping) take more and more time to reach the transducer. If the target is stationary, the time difference between firing and receiving the reflection (the echo) will remain constant. If the target is moving toward the transducer, this time difference decreases progressively on each firing. The ultrasonic RF pulses are generated in a transmitter (TRANSM.) 12. The output from the transducer is an electrical RF pulse signal which is applied to a receiver 14. Gating circuits (not shown) may be used to prevent the high power transmitted pulse from reaching the receiver. Timing pulses (tmg) and the pulse received by the receiver designate the travel time and are utilized in a range detector 16. The output of the range detector provides the coarse range upon deducting the $\tau_0$ value and provides a range shift which is used to move the butterfly trajectories to the correct range for the target of interest. The range output may also be applied to a brightness or B display for displaying an image when the ultrasonic pulses are scanned over a target area, for example, the heart or womb, to provide an image of an organ or embryo of interest. To limit the search for velocities in ranges of interest, it may be desirable to change scale and filter settings which change the number of butterfly lines, the spacing between the butterfly lines and the range of search, and thereby shift the velocity ranges which are covered by the lines.

The echo signals from the receiver may be applied to a pre-processor which includes moving target indicator (MTI) rejection circuits thereby reducing clutter and noise in the signals, s[n,t] which are presented to the detection and velocity sampling and estimating elements of the system. A preprocessor 20 with conventional MTI or clutter elimination circuitry may be used for this purpose. The echo signals from a point spread target, have the form and can be expressed in terms of the first echo, in a set of echoes by resetting the time axis origin each time the transducer 10 fires. This echo signal may be expressed, in simplest form, neglecting attenuation, beamwidth, and other system effects, as $$s[n,t] = A \cos\left\{\omega_0\left[t - 2n\frac{v_o}{c}T\right] + \phi_0\right\}r\left(t - 2n\frac{v_o}{c}T\right) \quad [2.01a]$$

$$n = 0,1,2,\ldots,N.$$

In discrete time representation for sample i, this expression becomes $$s[n,i] = A \cos\left\{\omega_0\left[\frac{i}{f_f} - 2n\frac{v_o}{c}T\right] + \phi_0\right\}r\left(\frac{i}{f_f} - 2n\frac{v_o}{c}T\right) \quad [2.01b]$$

In equations 2.01a and b: A is the signal amplitude (a constant); n is the index for the repeated echoes (the slow time index, n=0, 1 ... 4 in the plot shown in FIGS. 1, 2 and 4); T is the pulse repetition period, $\phi_0$ is a phase term depending upon the distance of the target from the transducer 10 at the time of first firing (n=o); $\omega_o$ is the angular center frequency of the RF ultrasonic transmission; r(t) is the envelope of the transmitted pulse, v is the velocity of the target which is $v_0$ and can vary over the range from $-v_p$ to $+v_p$ ($\pm v_p$ being the velocity range of interest); $f_f$ is the fast time sampling frequency where the i samples are taken, c is the velocity of the ultrasonic waves in the target medium, and the factor of two in equations 2.01a and b comes from the round trip travel time of the wave.

Three different types of signals may be processed and any may be selected. For the RF signal processing, where the RF pulse echoes shown in FIG. 1 is utilized, a direct connection is made. Otherwise, the signal may be demodulated by quadrature demodulator 22 or in a envelope detector 24. The resulting signals after envelope detection are denoted as e(n,t) and the complex envelope, consisting of the quadrature components, is $\tilde{r}$(n,t). The form of the RF ultrasonic pulse is the same as s[n,t] as given in equations 2.01a and b. For the envelope e(n,t) for the n lines $$e(n,t) = A\ r\left(t - 2n\frac{v_o}{c}T\right)\!n = 0,1,2,\ldots,N. \quad [3.01a]$$

In discrete time representation $$e[n,i] = A\ r\left(\frac{i}{f_f} - 2n\frac{v_o}{c}T\right) \quad [3.01b]$$

The signal of interest is sampled by the butterfly samplers for each of the butterfly lines. In FIG. 5 separate samplers 26, 28 and 30–32 are used for each butterfly line. Each sampler may be of the type shown in FIG. 5a.

For the ultrasonic RF pulse or the RF envelope, this search is to find the butterfly line over which the butterfly sampled signal is the most constant over increasing n. Then for the RF envelope, the quantity in the brackets in equation 3.01a should be constant.

$$t - 2n\frac{v_o}{c}T = \tau_0, \tau_0 \text{ being a constant.} \quad [3.02a]$$

In other words, the time difference between successive lines should be $$\Delta t = 2\frac{v_o}{c}T.$$

In discrete time form $$\frac{i}{f_f} - 2n\frac{v_o}{c}T = \tau_0 \quad [3.02b]$$

Since i can have only integer values, sample points in a butterfly line may lie between two successive values of i. In such cases, linear interpolation may be used to obtain the correct velocity estimate.

Figure 5A:
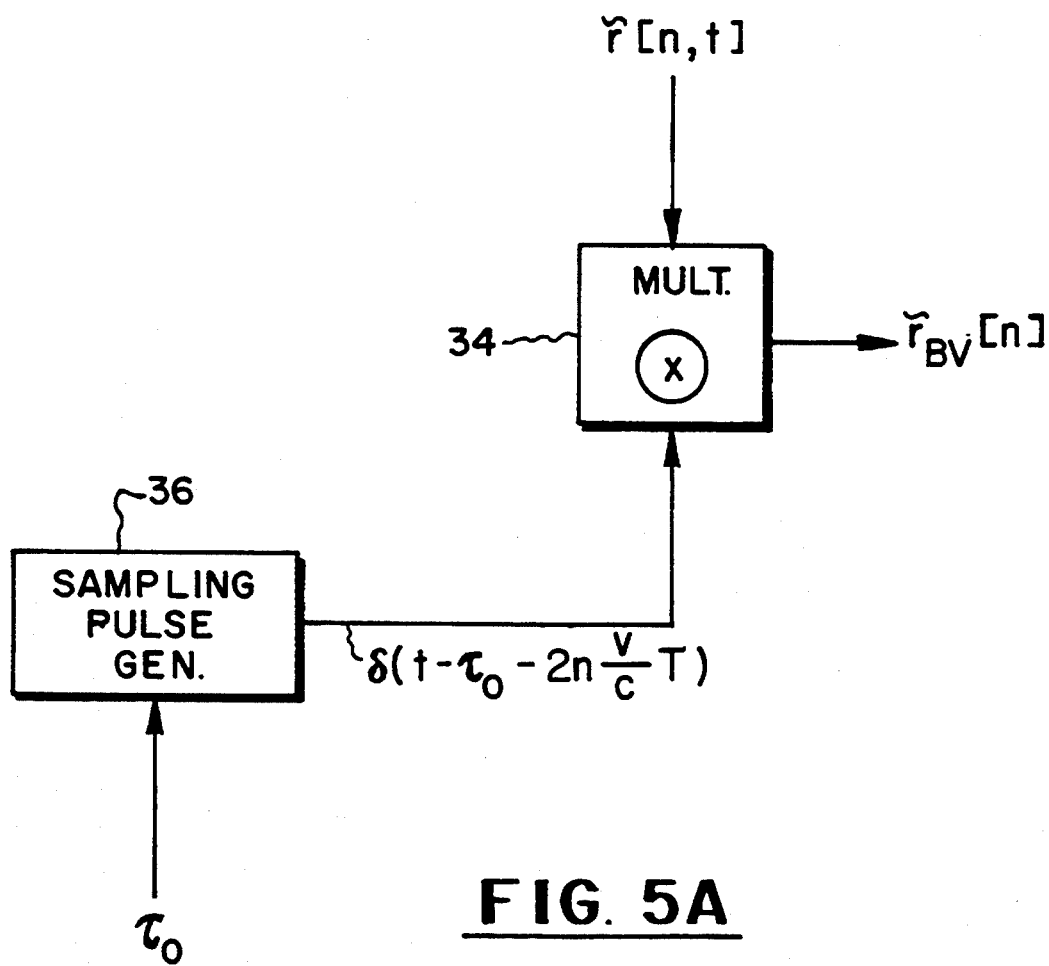
FIG. 5a is a block diagram of a butterfly sampler shown in FIG. 5.

As shown in FIG. 5a, a multiplier 34 provides as an output, one dimensional signal for all the samples obtained around the range shift $\tau_o$ which are generated in a sampling pulse generator 36. The sampling pulse generator generates a delta function $$\delta\left[t - \tau_o - 2n\frac{v}{c}T\right] \quad [3.16]$$

In this delta function for the butterfly sampler 26, v is $v_{-1}$. In the butterfly sampler 28, for the $v_0$ line, v is $v_0$. In the butterfly sampler 30 for the $v_{-1}$ line, v is $v_{-1}$. Thus, there are different sampling times which dictates separate searches along each of the butterfly lines in the butterfly array. The output of each sampler, when envelopes are processed, is a one dimensional signal $e_{Bv}[n]$ where v is the velocity for each of the lines. These one dimensional signals are applied to a maximum correspondence selector 38 to select the most likely velocity. Different estimators 38 are used depending upon the output signal which is sampled, and whether it is the RF echo, the RF envelope, or the quadrature components.

In the case of envelope signals, the maximum correspondence selector 38 selects the butterfly line with minimum variance and its slope can be used for the target velocity estimation.

$$\hat{v} = \min_{v}\{var(e_{Bv}[n])\} \quad [3.04]$$

where $var(e_{Bv}[n])$ is the variance of the butterfly sampled envelope $e_{Bv}[n]$ on the v butterfly line.

When the output signal is the result of quadrature demodulation, the search for the correct velocity combines aspects of both time domain and frequency domain processing. The quadrature signals I and Q along the correct butterfly line will have a single frequency waveform whose frequency depends on the velocity, or slope of the butterfly line. Even in the presence of noise which would introduce other frequencies, the correspondence with the expected frequency will maximize on the correct butterfly line. The search is conducted where the I and Q components in each line is checked for the corresponding unique frequency as illustrated in FIG. 4.

As previously stated in equation (2.01a), the nth scan line will have the form $$s[n,t] = A \cos\left(\omega_0 \left[t - 2n\frac{v_o}{c}T\right] + \phi_0\right) r\left(t - 2n\frac{v_o}{c}T\right); \quad [3.05a]$$

$$n = 0,1,2,\ldots,N.$$

In discrete time representation per equation [2.01b]

$$s[n,i] = A \cos\left(\omega_0 \left[\frac{i}{f_f} - 2n\frac{v_o}{c}T\right] + \phi_0\right) r\left(\frac{i}{f_f} - 2n\frac{v_o}{c}T\right) \quad [3.05b]$$

The envelope r(t) is assumed to be Gaussian, hence the quadrature components along any given line will be Gaussian. The complex envelope is $$\tilde{r}[n,t] = i[n,t] + j\, q[n,t] = \quad [3.06a]$$

$$\frac{A}{2}\exp j\left(2\omega_0 n \frac{v_o}{c}T - \phi_0\right) r\left(t - 2n\frac{v_o}{c}T\right)$$

In discrete time representation, $$\tilde{r}[n,i] = \frac{A}{2}\exp j\left(2\omega_0 n \frac{v_o}{c}T - \phi_0\right) r\left(\frac{i}{f_f} - 2n\frac{v_o}{c}T\right) \quad [3.06b]$$

In case of the discrete time sampled data, for points lying between data samples, linear interpolation could be used.

Now, if we sample the complex envelope with the restriction, as imposed for the butterfly method on RF or envelope, that is, the time difference for the sampling trajectory between successive lines, $$\Delta t = 2\frac{v_o}{c}T \quad [3.07]$$

then, the complex envelope along this sampling trajectory is given by, $$\tilde{r}_{Bv_o}[n] = \frac{A}{2}\exp j\left(2\omega_0 n \frac{v_o}{c}T - \phi_0\right) r(\tau_o), \quad [3.08a]$$

where $\tau_o$ is the reference time delay of the echo (FIG. 7), and $\tilde{r}_{Bv}[n]$ denotes sampling along the butterfly line for velocity v, $$\tilde{r}_{Bv}[n] = \tilde{r}(n,t)\delta\left(t - \tau_o - 2n\frac{v}{c}T\right) = \quad [3.08b]$$

$$\frac{A}{2}\exp j\left(2\omega_0 n \frac{v_o}{c}T - \phi_0\right) r\left(\tau_o + 2n\frac{v - v_o}{c}T\right)$$

As depicted in FIG. 4 (which illustrates the technique as applied for a single point spread target without noise), both of I and Q samples along the correct butterfly line would sample a single frequency constant amplitude sinusoid with respect to the index n. And, for each velocity, on the correct butterfly line, that distinct single frequency is unique, and under ideal conditions all the signal energy on the correct butterfly line would be concentrated only at that frequency. With noise present, that particular frequency would still be expected to have maximum energy. If we investigate each butterfly line for the power contained in the frequency corresponding to that line, normalized by the total power, the maxima should occur on the correct line ($v = v_o$).

To illustrate this, consider the case of FIG. 4 and examine samples along other butterfly lines.

On an incorrect line, which would have sampling instants, $$\Delta t = 2n\frac{v}{c}T. \quad [3.09]$$

$$\tilde{r}_{Bv}[n] = \frac{A}{2}\exp j\left(2\omega_0 n \frac{v_o}{c}T - \phi_0\right) r\left(\tau_o + 2n\frac{v - v_o}{c}T\right) \quad [3.10]$$

As $r()$ varies with n, these signals are now amplitude modulated and should be rejected.

We determine the frequency-specific energy along each butterfly line by applying orthogonality.

Since equation (3.08a) shows that the signal $r_{Bv_o}[n]$ is a constant amplitude, single frequency complex exponential, and since the frequency term $$\left(2\omega_0 \frac{v_o}{c}T\right)n$$

is known a-priori and is unique for this trajectory, then by orthogonality, $$\sum_n \tilde{r}_{Bv_o}[n]\, e^{-j\bar{\omega}n} \text{ will maximize when } \bar{\omega} = 2\omega_0 \frac{v_o}{c}T. \quad [3.11]$$

Thus, let $$\tilde{b}_v[n] = \sum_n \tilde{r}_{Bv}[n] e^{-j2\omega_0 \frac{v}{c} Tn}. \quad [3.12]$$

Then $$\tilde{b}_{v_0}[n] = \quad [3.13]$$

$$\sum_n \frac{A}{2} e^{j2\omega_0 n \frac{v_0}{c} T} e^{-j2\omega_0 n \frac{v_0}{c} T} e^{-j\phi} r(\tau_o) = n\frac{A}{2} e^{-j\phi} r(\tau_o),$$

and, $$|\tilde{b}_{v_0}[n]|^2 = \tilde{b}_{v_0}[n]\tilde{b}_{v_0}^*[n] = n^2 \frac{A^2}{4} r^2(\tau_o), \quad [3.14]$$

where an incorrect choice of butterfly line (and velocity) will produce a lesser outcome in comparison to the total energy of $$\tilde{r}_{Bv_0}[n].$$

For the butterfly search over quadrature signals, a likelihood function L(v) is evaluated in maximum correspondence selector, shown in FIG. 6 for v=v₀. To determine the likelihood, the samples along each butterfly line are evaluated by maximization thereof which occurs when the complex conjugate for the expected signal, if it would have occurred along that butterfly line, is multiplied with the actual signal. Accordingly, the complex conjugate is generated in a generator 40 and multiplied in a multiplier 42 with the signal. In FIG. 6, the sample signal along the v₀ line is considered. Each echo of the n echoes provides a product which is summed in a summer 44. The sum is squared in a squaring circuit 46. The output is normalized by dividing by the reciprocal of the signal obtained from the v₀ butterfly line sampler. That signal is squared in a squaring circuit 48. The sum of the squares is taken in a circuit 50 and inverted in a reciprocal generator 52. The product obtained in a multiplier 54 is the likelihood ratio or function, L(v₀) of the signal on the v₀ line.

All of the functions of the elements 40 to 54 may be performed by operations in a digital computer on the sample values or by dedicated hardware. The computer may be programmed in accordance with conventional programming techniques to provide the L(v) output. All the L(v) outputs are applied to a maximum detector 58 and the velocity v corresponding to the maximum L(v) will be read out as the correct velocity. This velocity may be applied to the display and used in imaging operations or in the spectral Doppler mode.

Mathematically, it can be shown that the maximum obtained from the likelihood functions correctly identifies the butterfly line corresponding to the correct velocity.

For each butterfly line we evaluate a likelihood term, $$L(v) = \frac{\left| \sum_n \tilde{r}_{Bv}[n] e^{-j2\omega_0 n \frac{v}{c} T} \right|^2}{\sum_n |\tilde{r}_{Bv}[n]|^2} \quad [3.15]$$

-continued where $$\tilde{r}_{Bv}[n] = \tilde{r}[n,t]\delta\left[t - \tau_o - 2n\frac{v}{c}T\right]. \quad [3.16]$$

L(v) maximizes only at v=v₀.
So, we can determine the velocity by finding the maximum of L(v), $$\hat{v} = \max_v \{L(v)\}; \quad [3.17]$$

and, the mean velocity can be evaluated by finding the following weighted mean, $$\bar{v} = \frac{\sum_i \hat{v}_i L(\hat{v}_i)}{\sum_i L(\hat{v}_i)} \quad [3.18]$$

The correct velocity may be obtained by premultiplication of the quadrature components with the complex exponent to simplify the likelihood ratio detectors for each butterfly line sample set. The system as shown in FIG. 8 uses such premultiplication. This simplification is obtained by evaluating the expression for L(v) given in equation 3.15 and repeated below.

For the estimation, we evaluate $$L(v) = \frac{\left| \sum_n \tilde{r}_{Bv}[n] e^{-j2\omega_0 n \frac{v}{c} T} \right|^2}{\sum_n |\tilde{r}_{Bv}[n]|^2} = \frac{|A(v)|^2}{B} \quad [4.01]$$

where $$\tilde{r}_{Bv}[n] = \tilde{r}[n,t]\delta\left[t - \tau_o - 2n\frac{v}{c}T\right], \quad [4.02]$$

$$A(v) = \sum_n \tilde{r}_{Bv}[n] e^{-j2\omega_0 n \frac{v}{c} T} \quad [4.03]$$

and, $$B = \sum_n |\tilde{r}_{Bv}[n]|^2 \quad [4.04]$$

We can determine the velocity by finding the maximum of L(v), $$\hat{v} = \max_v \{L(v)\}; \quad [4.05]$$

and, the mean velocity can be evaluated by finding the following weighted mean, $$\bar{v} = \frac{\sum_i \hat{v}_i L(\hat{v}_i)}{\sum_i L(\hat{v}_i)} \quad [4.06]$$

Now, $$A(v) = \sum_n \bar{r}_{Bv}[n]e^{-j2\omega_0 n \frac{v}{c} T} = \sum_n \bar{r}[n,t]\delta\left(t - \tau_o - 2n\frac{v}{c} T\right)e^{-j2\omega_0 n \frac{v}{c} T} \quad [4.07]$$

$$= \sum_n \bar{r}\left[n,\tau_o + 2n\frac{v}{c} T\right]e^{-j2\omega_0 n \frac{v}{c} T} \quad [4.08]$$

Let us define, $$\bar{r}(n,t+\tau_o) = \bar{r}[n,t+\tau_o]e^{-j\omega_o t} \quad [4.09]$$

Then, $$A(v) = \sum_n \bar{r}(n,t + \tau_o)\delta\left(t - 2n\frac{v}{c} T\right) \quad [4.10]$$

which is just a summation of a sampled signal.

Thus, the likelihood ratio L(v) can be evaluated as follows, $$L(v) = \frac{\left|\sum_n \bar{r}_{Bv}[n]\right|^2}{\sum_n |\bar{r}_{Bv}[n]|^2} \quad [4.11]$$

where $$\bar{r}_{Bv}[n] = \bar{r}(n,t)e^{-j\omega_o t}\delta\left(t - \tau_o - 2n\frac{v}{c} T\right) \quad [4.12]$$

Simplifications in the likelihood ratio detectors which provide the L(v) outputs, may thus be obtained as shown in FIG. 8 by complex processing where quadrature demodulation is followed by fast-time multiplication by a complex function. Similar symbology is used as is used in FIG. 6.

FIGS. 7a and 7b illustrate the envelope detector 24 and butterfly samplers 26, 28 and 30 for the sake of simplification. The maximum correspondence selector in this case employs variance detectors 80, 82 & 84, which as shown for the detector 80 consists of a summer which sums all of the samples and a squaring circuit. The sum of the squares is evaluated by squaring the sampled signal $e_{Bv}[n]$ and then taking the sum of the squares. The square of the sums is subtracted from the sum of the squares in an adder circuit 62 to provide the variance signal. The minimum variance signal is obtained in a minimum variance detector 64 to identify the correct butterfly line. In other words, the minimum variance detector 64 is effectively a comparator or which selects the maximum output which defines the output velocity estimate $\hat{v}$. A similar arrangement of variance detectors and comparators may be used to obtain the correct velocity butterfly line utilizing the RF ultrasonic pulses directly.

From the foregoing description, it will apparent that there has been provided an improved system (method and apparatus for velocity estimation) which is applicable to blood flow velocity measurement, as well as generally for measuring the velocity of moving reflectors. Color Doppler and color velocity imaging systems can utilize the improved system, whereby a butterfly search is conducted over each range of interest, and the velocity estimate for each depth is displayed as a color. Other variations, such as averaging of signals and averaging of butterfly estimates from nearby ranges in order to improve the noise immunity, are within the scope of $$s[n,t] = A\cos\left\{\omega_0\left[t - 2n\frac{v_o}{c} T\right] + \phi_0\right\}r\left(t - 2n\frac{v_o}{c} T\right) n = 0,1,2,\ldots,N. \quad [4.13]$$

$$= \frac{A}{2}\left[\exp j\left\{\omega_o\left(t - 2n\frac{v_o}{c} T\right) + \phi_o\right\} + \exp -j\left\{\omega_o\left(t - 2n\frac{v_o}{c} T\right) + \phi_o\right\}\right]r\left(t - 2n\frac{v_o}{c} T\right)$$

From premultiplication, $$\bar{r}(n,t)e^{-j\omega_o t} = \frac{A}{2}\exp j\left\{2\omega_o n\frac{v_o}{c} T - \phi_o\right\}r\left(t - 2n\frac{v_o}{c} T\right)e^{-j\omega_o t} \quad [4.14]$$

$$= \frac{A}{2}\exp -j\left\{\omega_o\left(t - 2n\frac{v_o}{c} T\right) + \phi_o\right\}r\left(t - 2n\frac{v_o}{c} T\right)$$

By comparing (4.13) and (4.14) we see that (4.14) can be obtained from the RF signal by just zeroing the positive frequency part in (4.13). This can further reduce the computation complexity, because this does away with complex envelope computation.

Thus, a similar likelihood ratio detector may be achieved even without the premultiplication step by using a Hilbert transform operator 60 as shown in FIG. 9. This step is identical to premultiplication by the complex exponential as shown in FIG. 8 and discussed above. That is why the steps after the complex processing are identical in FIG. 8 and FIG. 9.

olds on the L(v) signals, below which the data are deemed unreliable may be applied. These and other variations and modifications in the herein described system, within the scope of the invention, will undoubtedly suggest themselves to those skilled in the art. Accordingly, the foregoing description should be taken as illustrative and not in a limiting sense.

We claim:

1. The method of estimating the velocity of a target from repetitive echoes received in response to transmission of a plurality of repetitive pulses of propagating signals which comprises the steps of a. translating said echoes into a series of successive outputs which occur in time relationship dependent upon a set of preselected target trajectories,
b. searching for correspondence between the time relationship of said outputs and a plurality of expected time relationships each representing a different preselected target velocity, and
c. selecting the one of said preselected velocities wherein said correspondence is greatest as the estimated velocity of said target.

2. The method according to claim 1 wherein said translating step includes the step of receiving said echoes and providing outputs in the form of RF signal bursts for each of said echoes.

3. The method according to claim 2 wherein said searching step is carried out by sampling each of said RF signal bursts at a plurality of different series of times characterized by different time delay relationships between the times in each series, each time delay relationship corresponding to a different estimate of the velocity of said target, to provide a plurality of sets of samples each corresponding to a different target velocity, detecting the amplitudes of the samples in each of said sets, and
said selecting step is carried out by detecting the one of said sets in which the samples are in a relationship representing minimum variance in the amplitudes of the samples thereof, the velocity corresponding to said set exhibiting said minimum variance relationship and being the estimate of the velocity of said target.

4. The method according to claim 3 wherein said minimum variance relationship is obtained by detecting the minimum sum of the absolute difference in amplitude of each sample in each of said sets.

5. The method according to claim 3 wherein said minimum variance relationship is the minimum variation in amplitude of said envelopes in each set from a mean amplitude for that set.

6. The method according to claim 1 wherein said translating step includes the step of receiving said echoes and detecting the envelopes thereof to provide said outputs.

7. The method according to claim 6 wherein said searching step is carried out by sampling each of said envelopes in different series of times, the times in each series being in a different time delay relationship to provide a plurality of sets of samples each corresponding to a different estimate of the velocity of the target, detecting the amplitudes of the samples in each of said sets, and
said selecting step is carried out by detecting the one of said sets in which the samples are in a relationship representing minimum variance in the amplitudes of the samples thereof, the velocity corresponding to said set exhibiting said minimum variance relationship being the estimate of the velocity of said target.

8. The method according to claim 7 wherein said minimum variance relationship is the minimum variation in amplitude of said envelopes in each set from a mean amplitude for that set.

9. The method according to claim 8 wherein said outputs are in a form $$s[n,t] = A \cos\left\{\omega_0\left[t - 2n\frac{v_o}{c}T\right] + \phi_0\right\} r\left(t - 2n\frac{v_o}{c}T\right)$$

$$n = 0,1,2,\ldots,N.$$

where s(n,t) is the output for each echo and n is an index corresponding to the order of each of said outputs in said series, $v_0$ is the velocity of the target, T is the pulse repetition period of the repetitive pulses of ultrasonic signals which are transmitted, t is time, $\omega_0$ is the angular frequency of the ultrasonic signals, r(t) is the envelope of the transmitted pulses, $\phi_0$ is a phase term depending upon the distance (range) of the target from the point at which said pulses are transmitted when the first of said pulses in said series is transmitted, and 2 is a factor for the round trip time between transmission of each of the pulses of ultrasonic signals in each of said series and the reception of the echo in response thereto
, and in discrete time relationship where i is each sample index and $f_f$ is the sampling frequency $$s[n,i] = A \cos\left\{\omega_0\left[\frac{i}{f_f} - 2n\frac{v_o}{c}T\right] + \phi_0\right\} r\left(\frac{i}{f_f} - 2n\frac{v_o}{c}T\right)$$

and the envelopes of each of said outputs, s(n,t) in each series of n outputs is $$e(n,t) = A r\left(t - 2n\frac{v_o}{c}T\right) n = 0,1,2,\ldots,N.$$

where A is a constant, and
which in discrete time representation is $$e[n,i] = A r\left(\frac{i}{f_f} - 2n\frac{v_o}{c}T\right)$$

and the series of times in which each of said samples is sampled separated in time by $\Delta t$ where $$\Delta t = 2\frac{v}{c}T.$$

and the butterfly line with this sampling produces an output $e_{Bv}[n]$ which has a variance var ($e_{Bv}[n]$) being minimal along one of a plurality of lines of different slopes corresponding to $v_{-p}\text{---}v_0\text{---}v_p$ in co-ordinates of n and t where n is spaced by intervals corresponding in time to T, said one of said plurality of lines corresponding to $v_0$ where $v_0$ is the target velocity, the velocity of the target is estimated by finding the minimum of var ($e_{Bv}[n]$), $$\hat{v} = \min_{v} \text{var}(e_{Bv}[n])$$

where var ($e_{Bv}[n]$) is the variance on the one of said lines for target velocity v.

10. The method according to claim 7 wherein said minimum variance relationship is obtained by detecting the minimum sum of the absolute difference in amplitude of each sample in each of said sets.

11. The method according to claim 1 wherein said translating step includes the step of translating each of said outputs into quadrature related components thereof, and providing output signals which vary in accordance with these quadrature related components.

12. The method according to claim 11 wherein said searching step is carried out by searching signals representing said quadrature components, and providing from said searching step a plurality of outputs representing the likelihood of each of said signals being in each of said plurality of time relationships, and said selecting step is carried out by selecting the velocity for the time relationship providing the maximum likelihood as the estimated target velocity.

13. The method according to claim 11 wherein the combination of the quadrature components are in the form of a complex envelope $$\tilde{r}[n,i] = i[n,i] + j\, q[n,i] =$$

$$\frac{A}{2} \exp j\left(2\omega_o n \frac{v_o}{c} T - \phi_o\right) r\left(t - 2n \frac{v_o}{c} T\right)$$

where n is an index corresponding to the order of each of said outputs in said series, t is time, T is the pulse repetition period of the repetitive pulses of ultrasonic signals which are transmitted, $v_0$ is the actual velocity of the target, $\omega_0$ is the angular frequency of the RF ultrasonic signals, $\phi_0$ is a phase term depended upon the distance of the target from the point the signal pulses are transmitted, 2 is a factor for the round trip time between transmission of each of the transmitted signal pulses and the reception of the echoes in response thereto, r(t) is the envelope of the transmitted pulses, and in discrete time representation i is each sample index and $f_f$ is the sampling frequency $$\tilde{r}[n,i] = \frac{A}{2} \exp j\left(2\omega_o n \frac{v_o}{c} T - \phi_o\right) r\left(\frac{i}{f_f} - 2n \frac{v_o}{c} T\right)$$

the time difference between the times of sampling of the complex envelope in each series of samples is $$\Delta t = 2 \frac{v}{c} T$$

where v is a discrete velocity $v_{-p}$ - - - $v_{-i}$, $v_0$, $v_1$ - - - $v_p$, the complex envelope of each series of samples is given by $$\tilde{r}_{Bv}[n] = \frac{A}{2} \exp j\left(2\omega_o n \frac{v_o}{c} T - \phi_o\right) r\left(\tau_o + 2n \frac{v - v_o}{c} T\right)$$

where $\tau_0$ is the time between the transmission and reception of the corresponding echo for the first ultrasonic pulse signal in said series of ultrasonic pulse signals and v is the velocity corresponding to each line, and said maximum correspondence is the maximum likelihood ratio L(v) for the samples in one of said series which in normalized form is $$L(v) = \frac{\left|\sum_n \tilde{r}_{Bv}[n]\, e^{-j2\omega_o n \frac{v}{c} T}\right|^2}{\sum_n |\tilde{r}_{Bv}[n]|^2}$$

where $$\tilde{r}_{Bv}[n] = \tilde{r}[n,i]\, \delta\left(t - \tau_o - 2n \frac{v}{c} T\right).$$

L(v) maximizes only at $v = v_0$, the velocity of the target being estimated by finding the maximum of L(v), $$\hat{v} = \max_v \{L(v)\}$$

14. The method according to claim 13 wherein the mean velocity of the target is represented as the following weighted mean $$\bar{v} = \frac{\sum_i \hat{v}_i L(\hat{v}_i)}{\sum_i L(\hat{v}_i)}$$

wherein each series of samples is $$\tilde{r}_{Bv}[n] = \frac{A}{2} \exp j\left(2\omega_o n \frac{v_o}{c} T - \phi_o\right) r\left(\tau_o + 2n\Delta \frac{v}{c} T\right)$$

from the general discrete form where $\tilde{r}_{Bv}[n] = \tilde{r}[n,i]\, \delta\left(t - \tau_o - 2n \frac{v}{c} T\right).$ 15. The method of detecting the velocity of a transcutaneous target selected from the group consisting of movement of tissue, organs and blood flow, from ultrasonic echoes received in response to a plurality of repetitive transmissions of ultrasonic pulse signals which comprises the steps of a. translating said echoes into a plurality of time displaced outputs, which are located in a space having at least two dimensions defined by orthogonal axes one of which is the time of transmission of said ultrasonic pulse signals and the other of which is the time elapsed between transmission of said pulse signals and the reception of said echoes, b. detecting upon which of a plurality of butterfly lines in an array containing a plurality of said lines, said time displaced outputs are most proximal, each of said lines corresponding to a different target velocity, and c. providing as an estimate of the velocity of said target the velocity which corresponds to the line of a plurality of lines which is most proximal to said time displaced output.

16. The method according to claim 15 wherein said outputs are obtained by quadrature demodulation as the complex amplitudes of said echoes, and said detecting step is carried out by sampling said outputs at times defined by each of said butterfly lines to provide a series of quadrature samples, and said estimate providing step is carried out by detecting the greatest correspondence between the butterfly line quadrature samples and the expected signal from a target traveling at a velocity represented by the slope of a butterfly line.

17. The method according to claim 16 wherein said greatest correspondence is obtained by computing the effective product of the outputs and a complex signal which correlates therewith when alike, normalized by said outputs, to provide outputs corresponding to the proximity of said outputs to each of said butterfly lines, and then selecting the output of maximum value as being the most proximal to one of said butterfly lines, said one butterfly line having a slope which is an estimate of the velocity of said target.

18. The method according to claim 17 wherein said effective product of the outputs and the complex signal is obtained by a complex processing step wherein the outputs obtained by quadrature demodulation are multiplied by a signal which represents a complex RF exponential.

19. The method according to claim 17 wherein said effective product of the outputs and a complex signal is obtained by a complex processing step wherein signals corresponding to said ultrasonic echoes are passed through a Hilbert transform operator.

20. Apparatus for estimating the velocity of a target from repetitive echoes received in response to transmission of a plurality of repetitive pulses of propagating signals which comprises means for translating said echoes into a series of successive outputs which occur in time relationship dependent upon a set of preselected target trajectories, means for searching for correspondence between the time relationship of said outputs and a plurality of expected time relationships each representing a different preselected target velocity, and means for selecting the one of said preselected velocities wherein said correspondence is greatest as the estimated velocity of said target.

21. The apparatus according to claim 20 wherein said translating means comprises means for receiving said echoes and providing outputs in the form of RF signal bursts for each of said echoes.

22. The apparatus according to claim 21 wherein said searching means comprises means for sampling each of said RF signal bursts at a plurality of different series of times characterized by different time delay relationships between the times in each series, each time delay relationship corresponding to a different estimate of the velocity of said target, to provide a plurality of sets of samples each corresponding to a different target velocity, means for detecting the amplitudes of the samples in each of said sets, and said selecting means comprises means for detecting the one of said sets in which the samples are in a relationship representing minimum variance in the amplitudes of the samples thereof, the velocity corresponding to said set exhibiting said minimum variance relationship and being the estimate of the velocity of said target.

23. The apparatus according to claim 22 wherein said minimum variance relationship is obtained by means for detecting the minimum sum of the difference in amplitude of each sample in each of said sets.

24. The apparatus according to claim 22 wherein said minimum variance relationship is the minimum variation in amplitude of said envelopes in each set from a mean amplitude for that set.

25. The apparatus according to claim 20 wherein said translating means comprises means for receiving said echoes, and means for detecting the envelopes of said echoes to provide said outputs.

26. The apparatus according to claim 35 wherein said searching means comprises means for sampling each of said envelopes in different series of times, the times in each series being in a different time delay relationship to provide a plurality of sets of samples each corresponding to a different estimate of the velocity of the target.

means for detecting the amplitudes of the samples in each of said sets, and said selecting means comprises means for detecting the one of said sets in which the samples are in a relationship representing minimum variance in the amplitudes of the samples thereof, the velocity corresponding to said set exhibiting said minimum amplitude variance relationship being the estimate of the velocity of said target.

27. The apparatus according to claim 26 wherein said minimum variance relationship is the minimum variation in amplitude of said envelopes in each set from a mean amplitude for that set.

28. The apparatus according to claim 27 wherein said minimum variance relationship is obtained by means for detecting the minimum sum of the absolute difference in amplitude of each sample in each of said sets.

29. The apparatus according to claim 27 wherein said outputs are in a form $$s[n,t] = A \cos\left\{\omega_o\left[t - 2n\frac{v_o}{c}T\right] + \phi_o\right\} r\left(t - 2n\frac{v_o}{c}T\right)$$

$$n = 0,1,2,\ldots N.$$

where s(n,t) is the output for each echo and n is an index corresponding to the order of each of said outputs in said series, $v_0$ is the velocity of the target, T is the pulse repetition period of the repetitive pulses of ultrasonic signals which are transmitted, t is time, $\omega_0$ is the angular frequency of the ultrasonic signals, r(t) is the envelope of the transmitted pulses, $\phi_0$ is a phase term depending upon the distance (range) of the target from the point at which said pulses are transmitted when the first of said pulses in said series is transmitted, and 2 is a factor for the round trip time between transmission of each of the pulses of ultrasonic signals in each of said series and the reception of the echo in response thereto , and in discrete time relationship where i is each sample index and $f_f$ is the sampling frequency $$s[n,i] =$$

$$A \cos\left\{\omega_o\left[\frac{i}{f_f} - 2n\frac{v_o}{c}T\right] + \phi_o\right\} r\left(\frac{i}{f_f} - 2n\frac{v_o}{c}T\right)$$

and the envelopes of each of said outputs, s(n,t) in each series of n outputs is $$e[n,i] = A r\left(t - 2n\frac{v_o}{c}T\right)$$

$n = 0,1,2,\ldots,N.$ where A is a constant, and
which in discrete time representation is $$e[n,i] = A\, r\left(\frac{i}{f_f} - 2n\frac{v_0}{c} T\right)$$

and the series of times in which each of said samples is sampled separated in time by $\Delta t$ where $$\Delta t = 2\frac{v}{c} T$$

and the butterfly line with this sampling produces an output $e_{Bv}[n]$ which has a variance var($e_{Bv}[n]$) being minimal along one of a plurality of lines of different slope corresponding to $v_{-p}\cdots v_0\cdots v_p$ in coordinates of n and t where n is spaced by intervals corresponding in time to T, said one of said plurality of lines corresponding to $v_0$ where $v_0$ is the target velocity, the velocity of the target is estimated by finding the minimum of var($e_{Bv}[n]$), $$\hat{v} = \min_v \text{var}(e_{Bv}[n])$$

where var($e_{Bv}[n]$) is the variance on the one of said lines for the velocity v.

30. The apparatus according to claim 20 wherein said translating means comprises means for translating each of said outputs into quadrature related components thereof, and means for providing output signals which vary in accordance with these quadrature related components.

31. The apparatus according to claim 30 wherein said searching means comprises means for searching signals representing said quadrature components, and means for providing from said searching step a plurality of outputs representing the likelihood of each of said signals being in each of said plurality of time relationships, and said selecting means comprises means for selecting the velocity for the time relationship providing the maximum likelihood as the estimated target velocity.

32. The apparatus according to claim 30 wherein the combination of the quadrature components are in the form of a complex envelope $$\tilde{r}[n,t] = i(n,t) + j\, q(n,t) =$$

$$\frac{A}{2} \exp j\left(2\omega_o n \frac{v_0}{c} T - \phi_o\right) r\left(t - 2n\frac{v_0}{c} T\right)$$

where n is an index corresponding to the order of each of said outputs in said series, t is time, T is the pulse repetition period of the repetitive pulses of ultrasonic signals which are transmitted, $v_0$ is the actual velocity of the target, $\omega_0$ is the angular frequency of the ultrasonic RF signals, $\phi_0$ is a phase term depended upon the distance of the target from the point which the signal pulses are transmitted, 2 is a factor for the round trip time between transmission of each of the transmitted signal pulses and the reception of the echoes in response thereto, r(t) is the envelope of the transmitted pulses, and in discrete time representation i is each sample index and $f_f$ is the sampling frequency $$\tilde{r}[n,i] = \frac{A}{2} \exp j\left(2\omega_o n \frac{v_0}{c} T - \phi_o\right) r\left(\frac{i}{f_f} - 2n\frac{v_0}{c} T\right).$$

the time difference between the times of sampling of the complex envelope in each series of samples differs by $$\Delta t = 2\frac{v}{c} T$$

where v is a discrete velocity $v_{-p}\cdots v_{-1}, v_1 \cdots v_p$ the complex envelope of each series of samples is given by $$\tilde{r}_{Bv}[n] = \frac{A}{2} \exp j\left(2\omega_o n \frac{v_0}{c} T - \phi_o\right) r\left(\tau_0 + 2n\frac{v - v_0}{c} T\right)$$

where $\tau_0$ is the time between the transmission and reception of the corresponding echo for the first ultrasonic pulse signal in said series of ultrasonic pulse signals and v is the velocity corresponding to each line, and said maximum correspondence selector is the maximum likelihood ratio L(v) for the samples in one of said series which in normalized form is $$L(v) = \frac{\left|\sum_n \tilde{r}_{Bv}[n]\, e^{-j2\omega_o n \frac{v}{c} T}\right|^2}{\sum_n |\tilde{r}_{Bv}[n]|^2}$$

wherein each series of samples is $$\tilde{r}_{Bv}[n] = \frac{A}{2} \exp j\left(2\omega_o n \frac{v_0}{c} T - \phi_o\right) r\left(\tau_0 + 2n\Delta\frac{v}{c} T\right)$$

from the general discrete form $$\text{where } \tilde{r}_{Bv}[n] = \tilde{r}[n,i]\, \delta\left[t - \tau_0 - 2n\frac{v}{c} T\right],$$

and the estimate of the velocity corresponds to the series of samples having the maximum normalized value of L(v)

$$\hat{v} = \max_v \{L(v)\}.$$

33. The apparatus according to claim 32 wherein the mean velocity of the target is represented as $$\bar{v} = \frac{\sum_i \hat{v}_i L(\hat{v}_i)}{\sum_i L(\hat{v}_i)}.$$

34. Apparatus for detecting the velocity of a transcutaneous target selected from the group consisting of movement of tissue, organs and blood flow, from ultrasonic echoes received in response to a plurality of repetitive transmissions of ultrasonic pulse signals which comprises means for translating said echoes into a plurality of time displaced outputs, which are located in a space having at least two dimensions defined by orthogonal axes, one of which is the time of transmission of said ultrasonic pulse signals and the other of which is the time elapsed between transmission of said pulse signals and the reception of said echoes, means for detecting upon which of a plurality of butterfly lines in an array containing a plurality of said lines said time displaced outputs are most closely proximal, each of said lines corresponding to a different target velocity, and means for providing as an estimate of the velocity of said target the velocity which corresponds to the line of a plurality of lines which is most proximal to said time displaced outputs.

35. The apparatus according to claim 34 wherein said outputs are obtained by means for quadrature demodulation as the complex amplitudes of said echoes, and said detecting means comprises means for sampling said outputs at times defined by each of said butterfly lines to provide a series of quadrature samples, and said estimate providing means comprises means for detecting greatest correspondence between the butterfly line quadrature samples and the expected signal from a target traveling at a velocity represented by the slope of a butterfly line.

36. The apparatus according to claim 35 wherein said greatest correspondence is obtained by means for computing the effective product of the outputs and a complex signal which correlates therewith when alike, normalized by the said outputs, to provide outputs corresponding to the proximity of said outputs to each of said butterfly lines, and means for selecting the output of maximum value as being the most proximal to one of said butterfly lines, said one butterfly line having a slope which is an estimate of the velocity of said target.

37. The apparatus according to claim 36 wherein said means for computing the effective product comprises means for complex processing wherein the outputs obtained by quadrature demodulation are multiplied by a signal which represents a complex RF operator to provide the time displaced outputs for said sampling means.

38. The apparatus according to claim 36 wherein said means for computing the effective product comprises complex processing means wherein signals corresponding to said echoes are passed through a Hilbert transform operator to provide said time displaced outputs.

* * * * *